(12) United States Patent
Wang et al.

(10) Patent No.: US 7,020,227 B1
(45) Date of Patent: Mar. 28, 2006

(54) METHOD AND APPARATUS FOR HIGH-SPEED CLOCK DATA RECOVERY USING LOW-SPEED CIRCUITS

(75) Inventors: David Y. Wang, San Jose, CA (US);
Jyn-Bang Shyu, Cupertino, CA (US);
Yu-Chi Cheng, Fremont, CA (US)

(73) Assignee: Acard Technology Corporation, Taipei Hsien (TW)

( * ) Notice: Subject to any disclaimer, the term of this patent is extended or adjusted under 35 U.S.C. 154(b) by 754 days.

(21) Appl. No.: 10/161,116

(22) Filed: May 31, 2002

(51) Int. Cl.
*H04L 7/00* (2006.01)

(52) U.S. Cl. .................. 375/355; 375/354; 375/360; 375/261

(58) Field of Classification Search ............ 375/355, 375/360, 261
See application file for complete search history.

(56) References Cited

U.S. PATENT DOCUMENTS

| | | | |
|---|---|---|---|
| 5,506,875 A | 4/1996 | Nuckolls et al. ............ 375/375 |
| 5,511,100 A | 4/1996 | Lundberg et al. ........... 375/376 |
| 5,844,436 A | 12/1998 | Altmann ..................... 327/156 |
| 5,898,744 A | 4/1999 | Kimbrow et al. ........... 375/376 |
| 5,953,386 A | 9/1999 | Anderson ................... 375/376 |
| 6,002,279 A * | 12/1999 | Evans et al. ................ 327/144 |
| 6,041,090 A | 3/2000 | Chen .......................... 375/376 |
| 6,052,034 A | 4/2000 | Wang et al. .................... 331/2 |
| 6,058,151 A | 5/2000 | Huang ........................ 375/376 |
| 6,075,416 A | 6/2000 | Dalmia ........................ 331/25 |
| 6,075,825 A | 6/2000 | Mizuhara .................... 375/316 |
| 6,122,336 A | 9/2000 | Anderson ................... 375/371 |
| 6,166,572 A | 12/2000 | Yamaoka .................... 327/149 |
| 6,222,419 B1 | 4/2001 | Yoshida ........................ 331/11 |
| 6,259,755 B1 | 7/2001 | O'Sullivan et al. ......... 375/376 |
| 6,285,261 B1 | 9/2001 | Pax et al. ..................... 331/17 |
| 6,317,005 B1 * | 11/2001 | Morel et al. .................. 331/20 |
| 6,795,510 B1 * | 9/2004 | Edde ........................... 375/326 |
| 6,901,126 B1 * | 5/2005 | Gu ............................. 375/355 |

OTHER PUBLICATIONS

Carlson, A. Bruce and Gisser, David G., "Electrical Engineering", Addison-Wesley, 1981, p. 564.*
L. Lin et al., "A 1.4GHz Differential Low-Noise CMOS Frequency Synthesizer Using a Wideband PLL Architecture", IEEE 2000, ISSCC 2000/ Session 12, TP 12.5, 1 page.

* cited by examiner

*Primary Examiner*—Mohammed Ghayour
*Assistant Examiner*—Anna Ziskind
(74) *Attorney, Agent, or Firm*—Schneck & Schneck; Thomas Schneck

(57) ABSTRACT

A clock data recovery (CDR) circuit that can be used for recovering data from a high-speed serial transmission using components that operate at a fraction of the data speed. The CDR consists of a phase detector, an averaging circuit and a phase interpolator. The phase detector samples each data bit at its midpoint and at its transitional region and then compares the two samples to determine whether the sampling clock, which is generated by a phase interpolator, is leading or lagging the data stream. The averaging circuit filters out the high frequency jitters in the phase detector output and then passes the filtered signals on to the phase interpolator for phase selection. The phase interpolator uses the filtered signals from the averaging circuit as a guide in the selection of an output clock phase that minimizes the phase difference between the output clock and the incoming data.

1 Claim, 9 Drawing Sheets

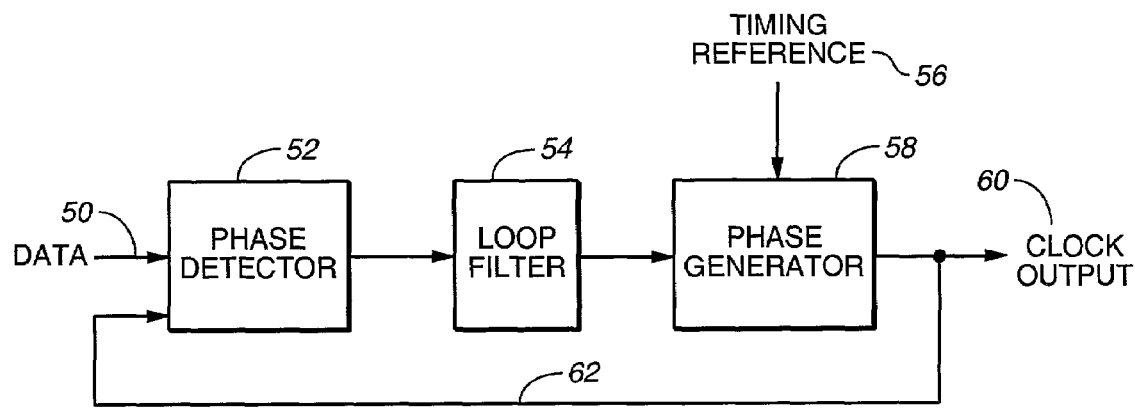
FIG._1 (PRIOR ART)
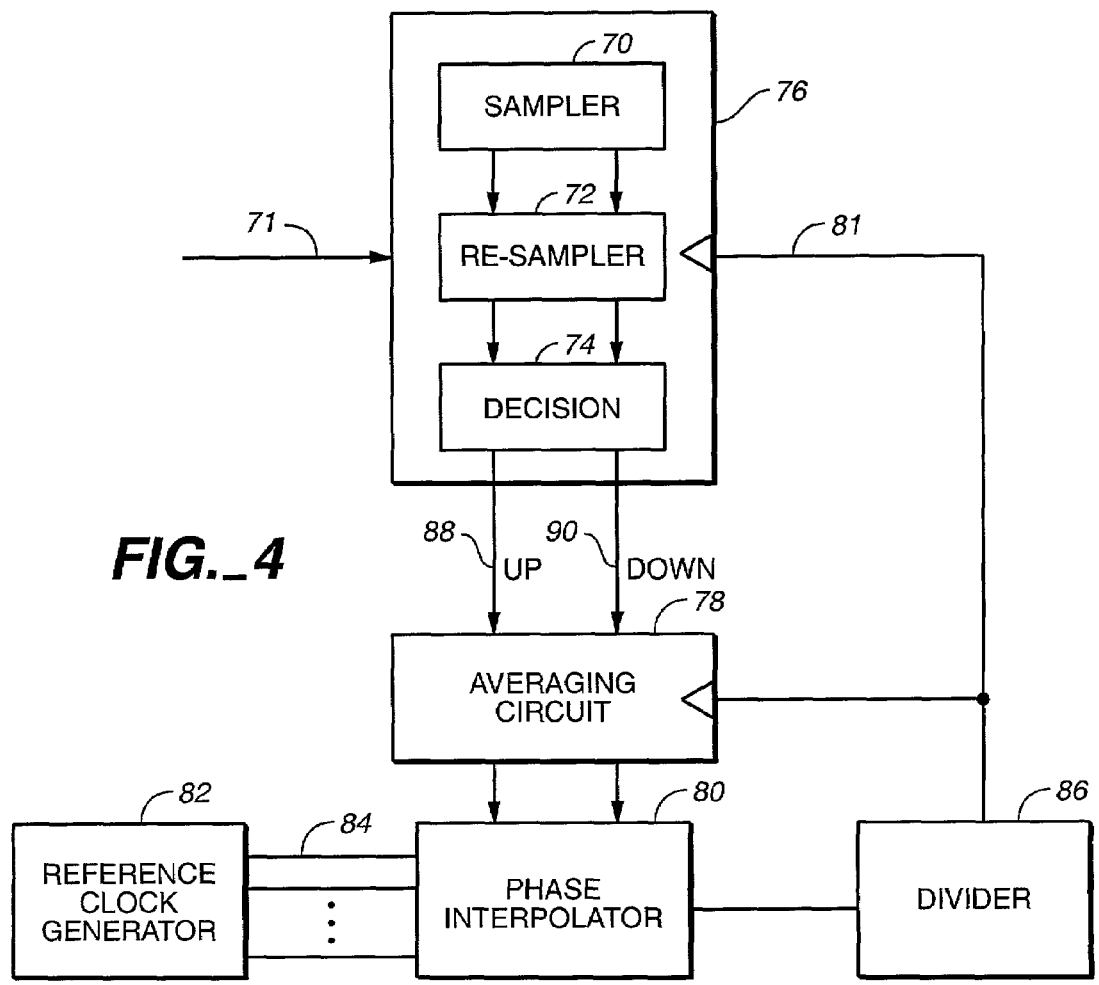
FIG._4

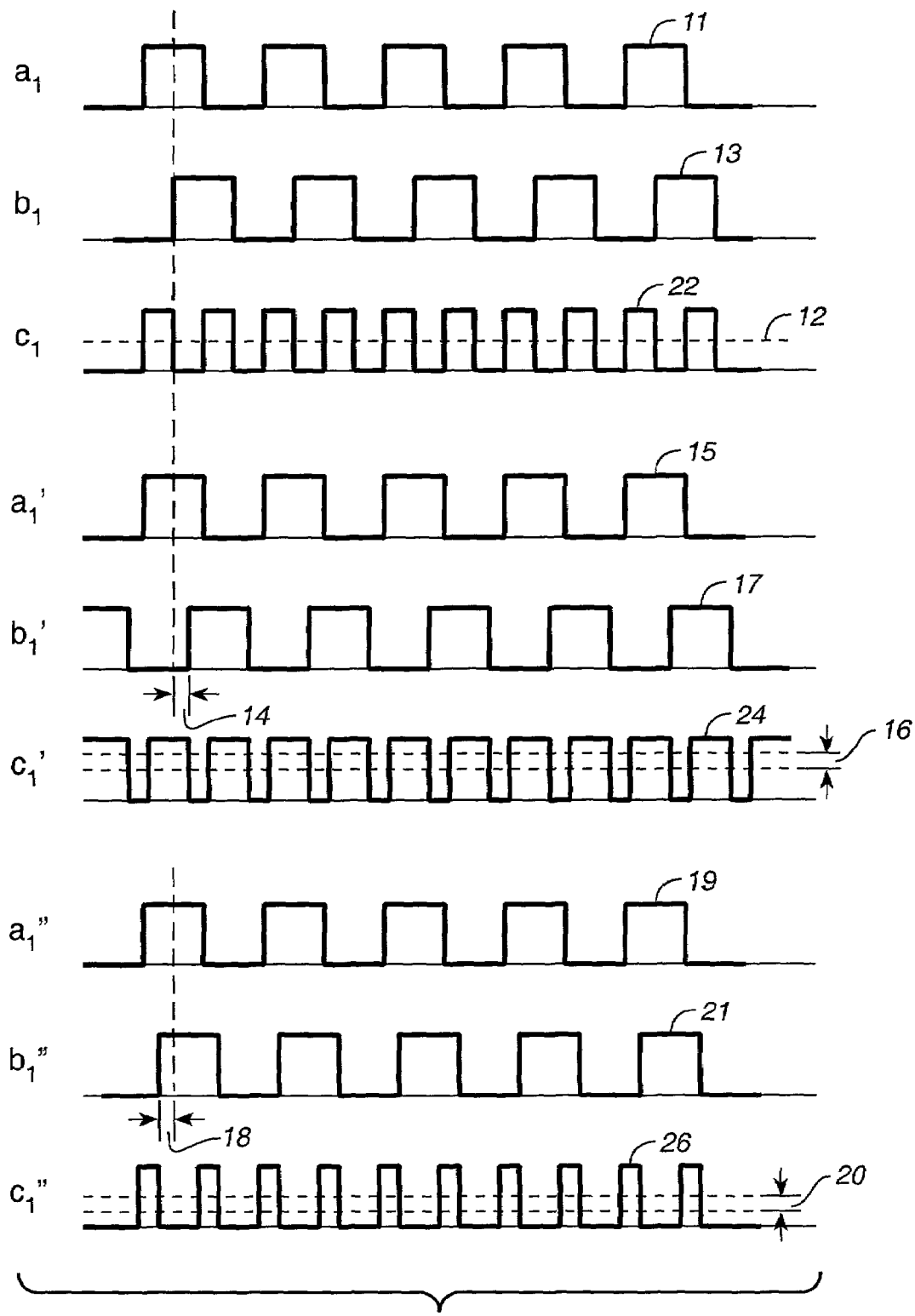
FIG._2 (PRIOR ART)

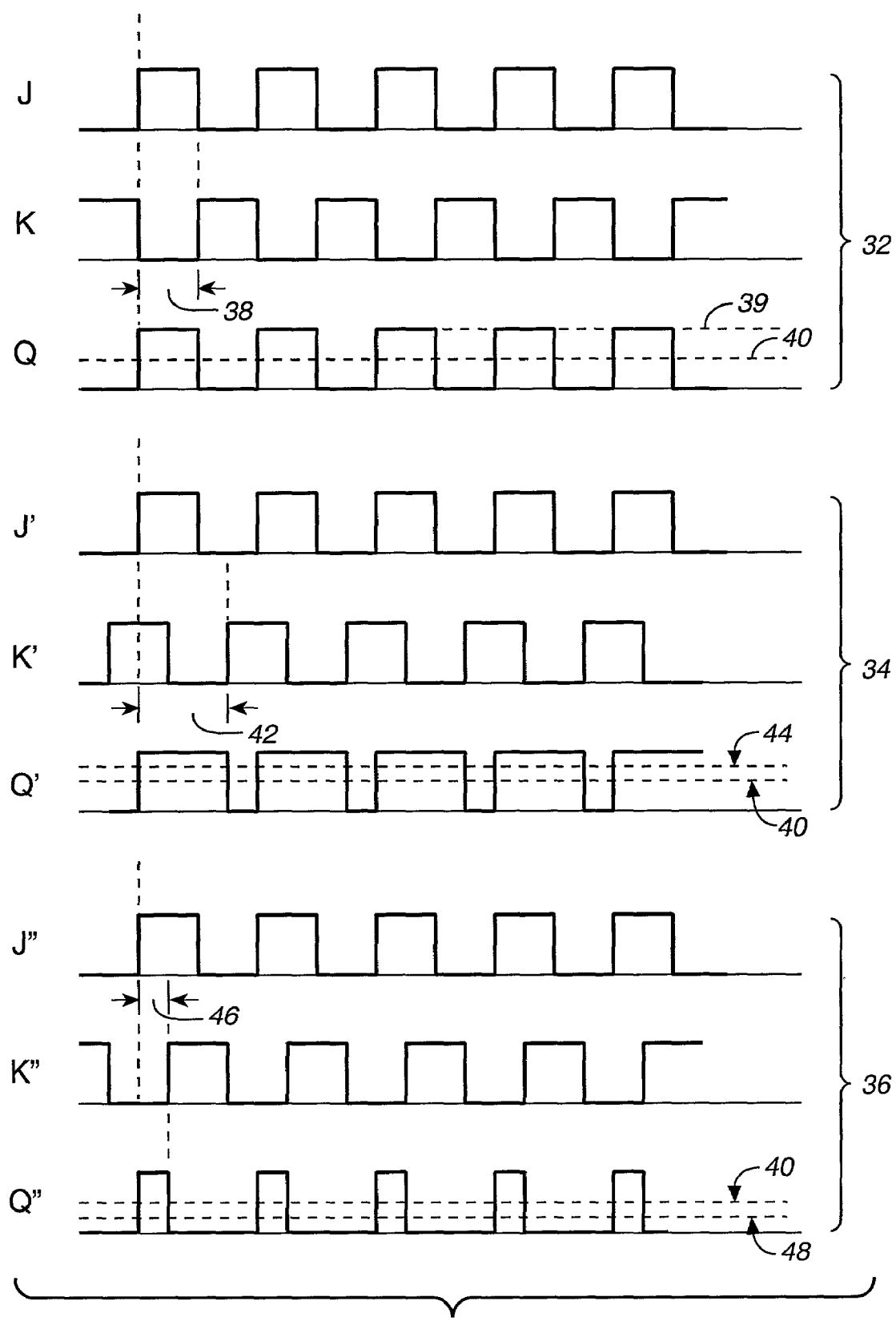
FIG._3 *(PRIOR ART)*

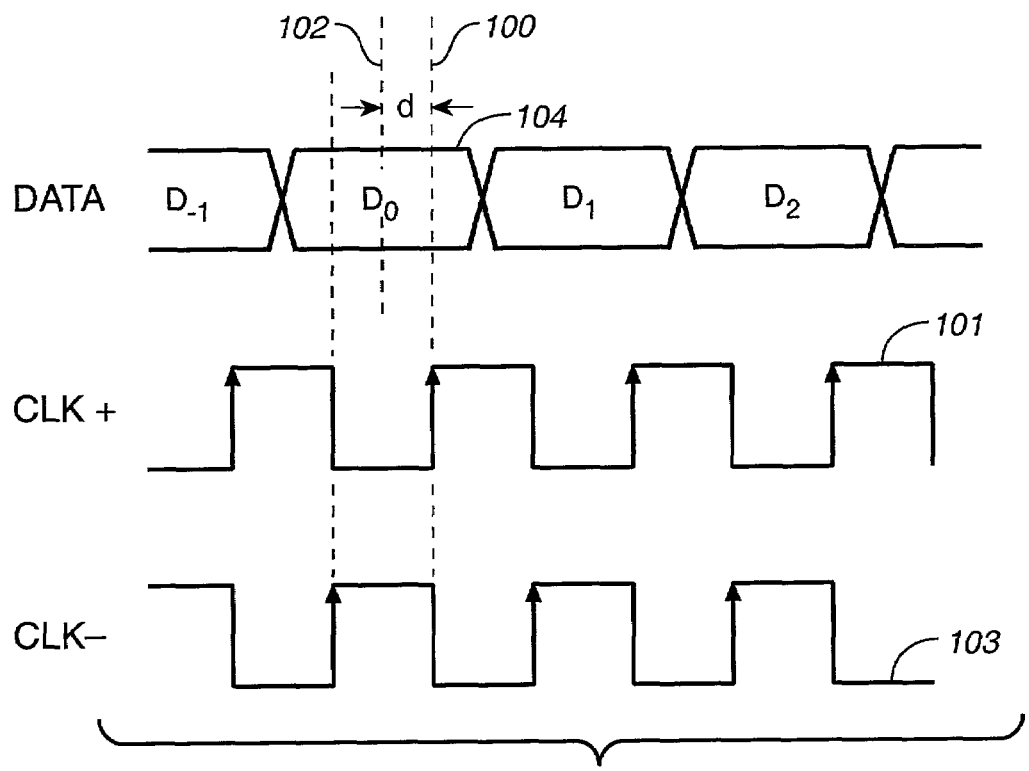
FIG._5A
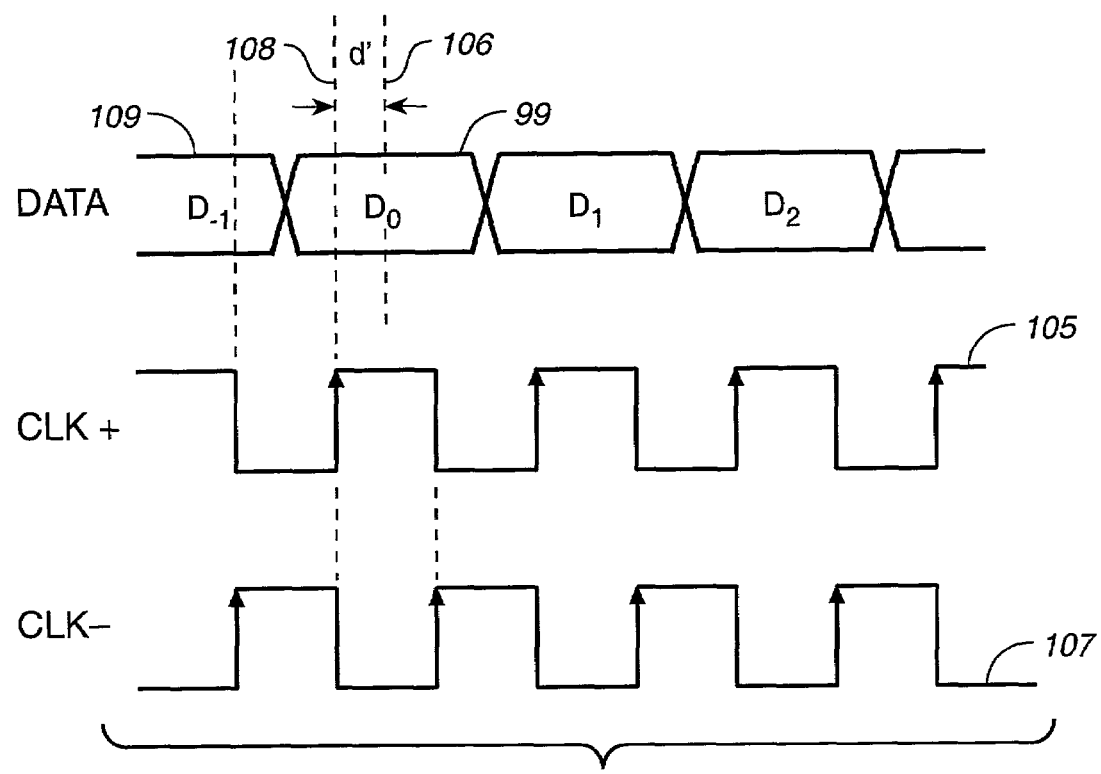
FIG._5B

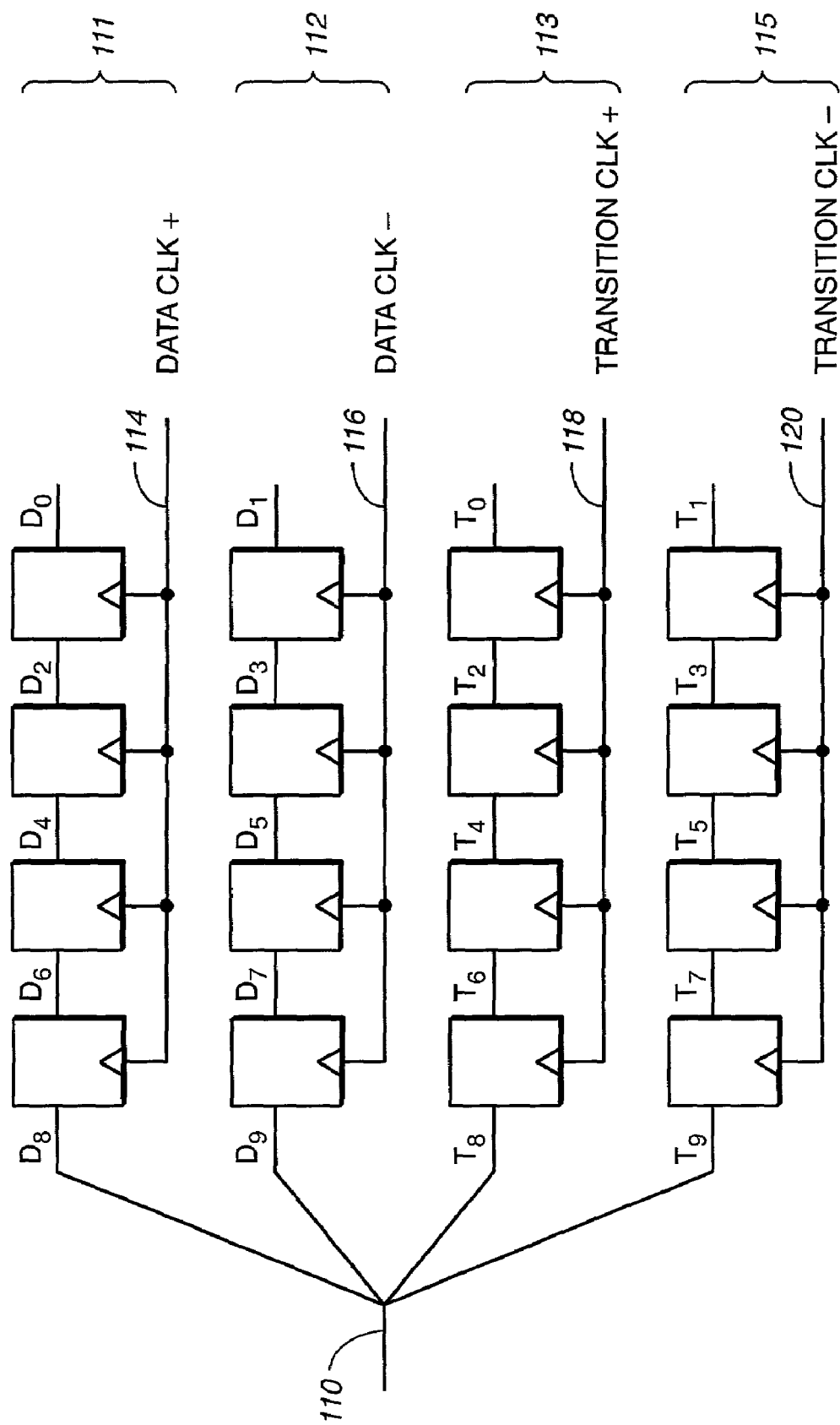
FIG._6

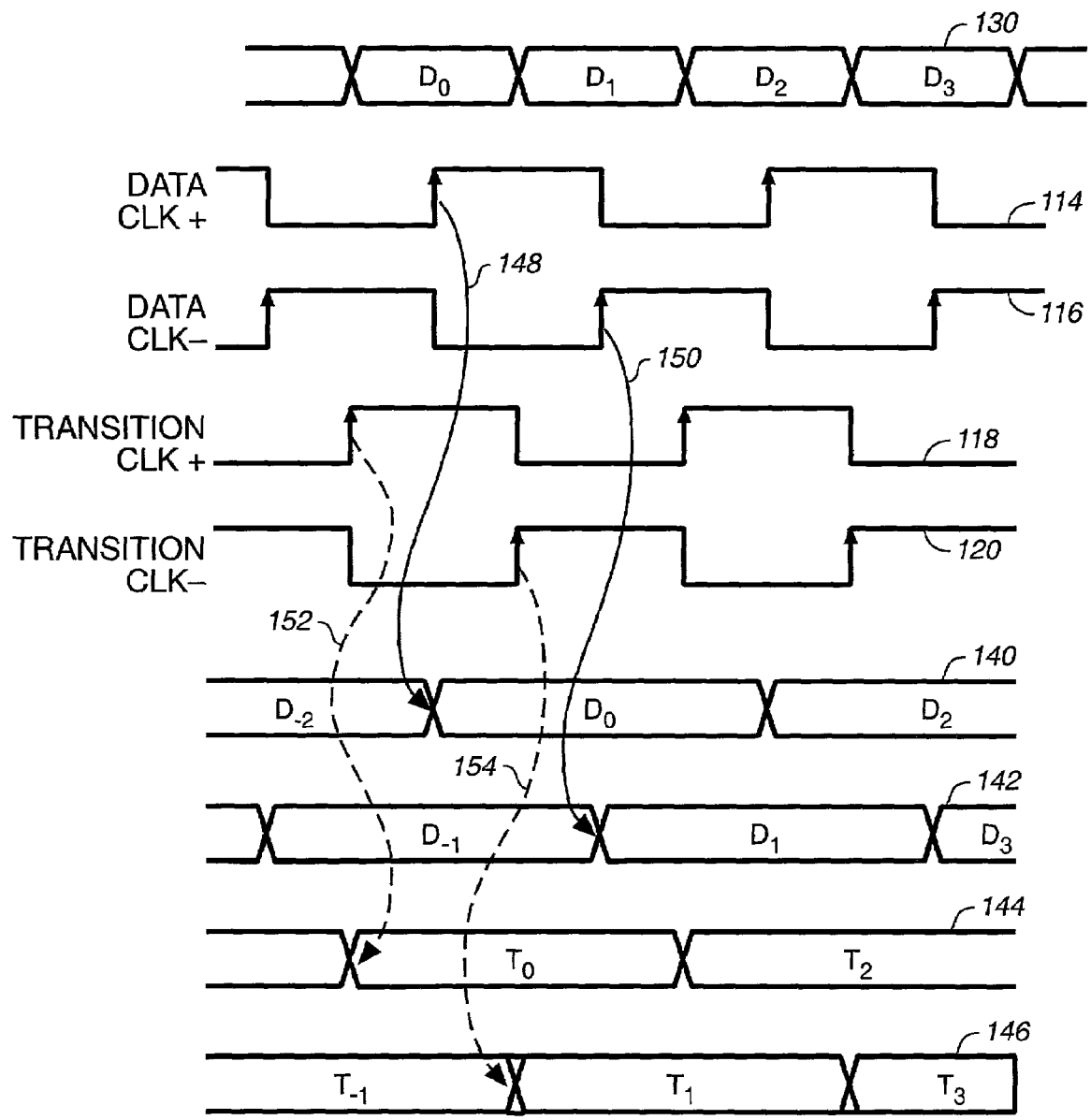
FIG._7

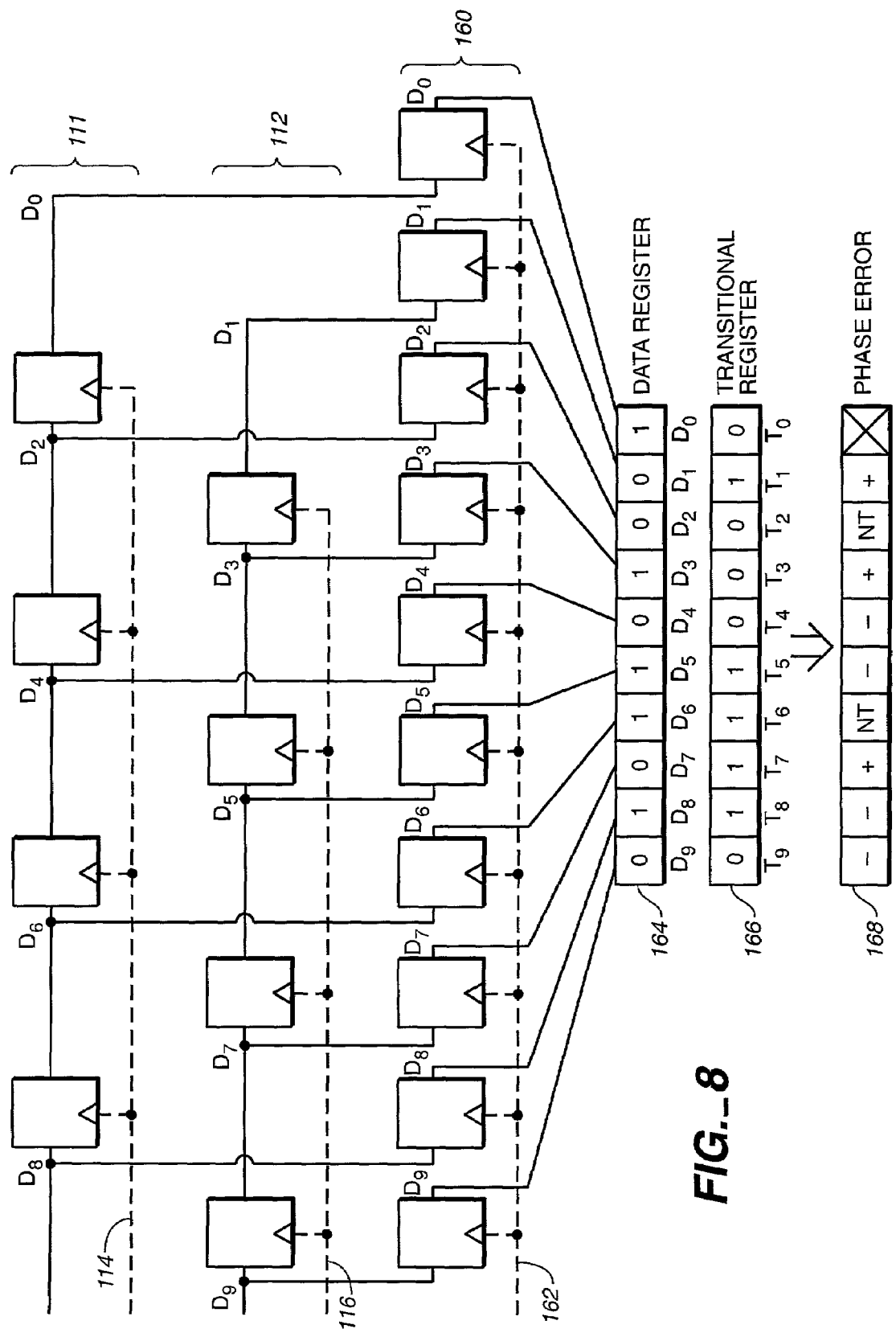
FIG._8

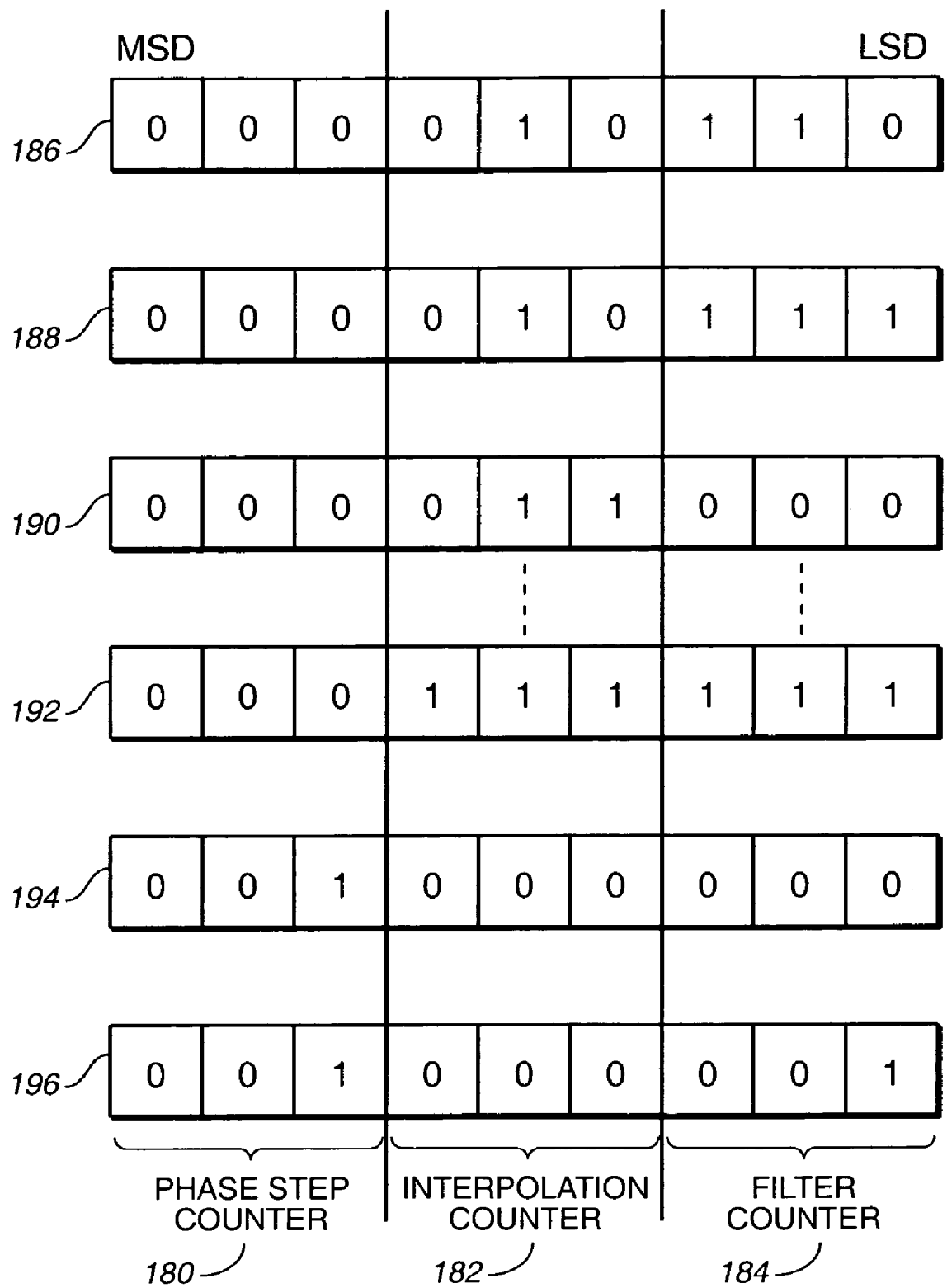
FIG._9

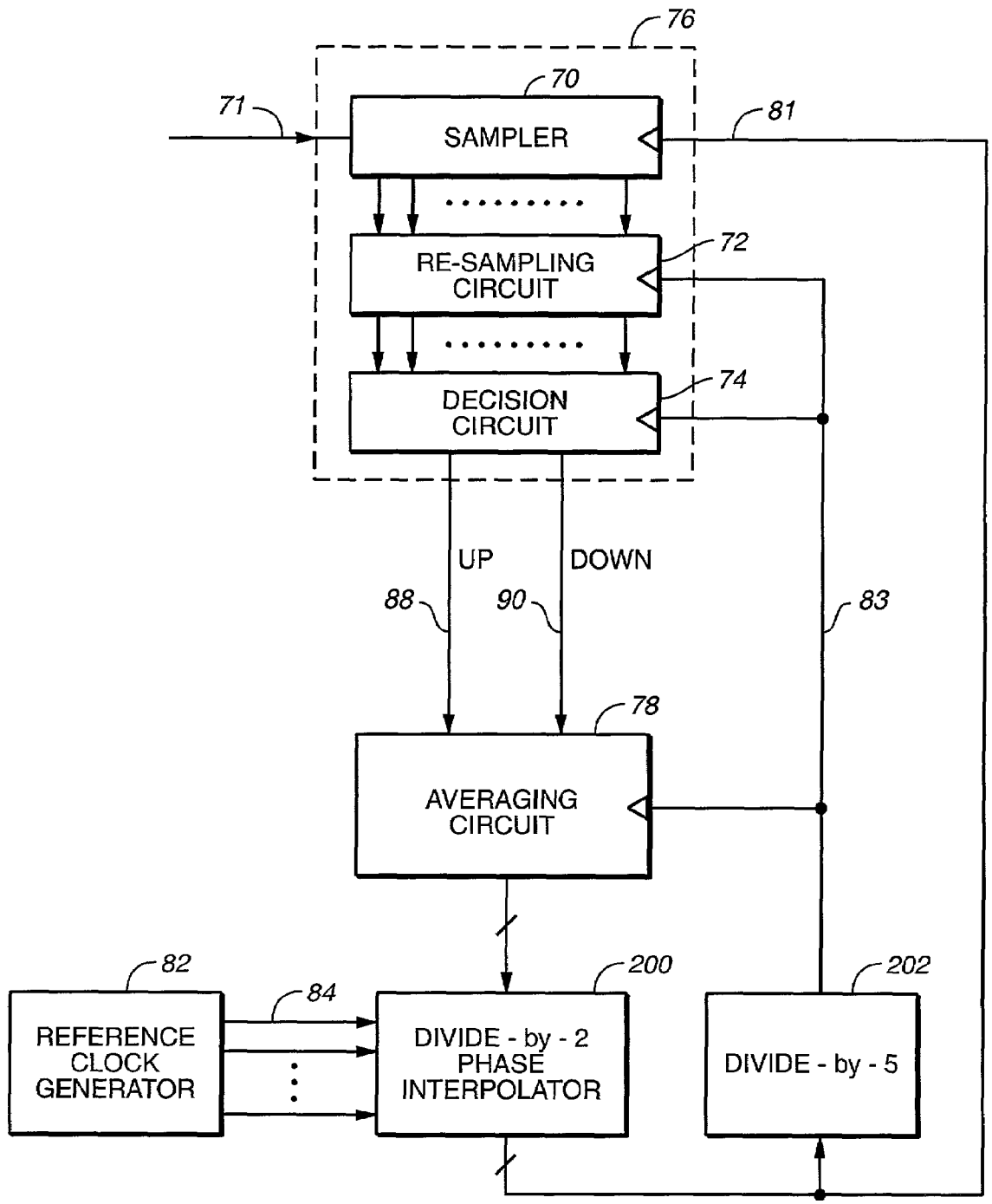
FIG._10

US 7,020,227 B1

METHOD AND APPARATUS FOR HIGH-SPEED CLOCK DATA RECOVERY USING LOW-SPEED CIRCUITS

TECHNICAL FIELD

The present invention relates to clock data recovery circuits, and in particular, to the use of digital phase lock loop circuits for clock data recovery.

BACKGROUND ART

In modern communication systems, data are typically transmitted serially. These data are clocked, i.e., sent synchronously with a clock signal, which is normally not transmitted. For a receiver to recover the incoming signal accurately, it is crucial that the receiving end be able to extract a clock frequency from the incoming data signal and then use the recovered clock frequency to decipher the received signal. Phase lock loops (PLL) have been used extensively for such clock data recovery (CDR). A CDR circuit typically consists of three main components: a phase detector, a loop filter, and a phase generator. FIG. 1 shows the configuration of a typical CDR circuit. The phase detector 52 compares an incoming data signal 50 with a sampling clock signal 62 generated by the phase generator 58 to determine if the signals 50, 62 are in phase. If the data signal 50 and the sampling clock signal 62 are not in phase, then an error signal is sent to the loop filter 54, which eliminates unwanted high frequency noise. The phase generator 58 takes inputs from the loop filter 54 and a timing reference signal 56 to adjust the signal 62 at output 60 in an effort to minimize the phase error between the output signal 62 and the incoming data 50.

However, for high speed serial communication in the gigabit per second range, CMOS processing technology is being pushed to its limit and manufacturing yields are low while, on the other hand, alternative technologies are costly.

An alternative technique to circumvent this dilemma calls for a divider unit at the receiving end to turn the serial data stream into two parallel data streams, effectively reducing the required processing speed of the phase detector by half. An example of this technique is taught by Anderson in U.S. Pat. No. 5,953,386. To achieve further clock speed reduction, additional dividers are required to be placed downstream of the first divider.

It would be desirable to have a simpler and more flexible clock data recovery technique that can recover data from a high speed serial transmission using a substantially reduced clock speed without the need for multiple stages of dividers.

With regard to the phase detector 52 of FIG. 1, traditionally either an XOR gate or an edge-triggered JK flip-flop has been used to extract a clock signal. FIG. 2 shows the operation of a phase detector using an XOR gate. Timing charts $a_1$ and $b_1$ represent the inputs into the XOR gate. Pulses 11 and 13 on charts $a_1$ and $b_1$ are 90 degrees out of phase with one another. The output of the XOR gate, shown in timing chart $c_1$, has an average level of half of the peak value compare levels 12 and 22 where 12 is the average level and 22 is the maximum. For a CDR that uses an XOR gate as phase detector, this average level 12 denotes the absence of a phase error. When the phase difference between the input signals a1 and b1 deviates from 90 degrees, the average level changes, signifying the presence of phase error. For instance, in the case when the input signal $b_1'$ lags the input signal $a_1'$ by more than 90 degrees, e.g. pulse 17 lags pulse 15, the average value of the output $c_1'$, level 24, raises above the half way level 12 and the phase error 16 in $c_1'$ becomes positive. On the other hand, when the input signal $b_1''$ lags the input signal $a_1''$, e.g. pulse 21 lags pulse 14, 19 by less than 90 degrees, e.g. amount 18, the XOR output $c_1''$ would have an average difference 20 below the half-way level 12.

FIG. 3 shows the operation of a JK flip-flop as a phase detector 52. The first set of timing signals 32 shows the case when no error signal is produced. For a JK flip-flop, when the inputs J and K are 180 degrees out of phase from one another 38, the output Q would produce a function having an average level 40 that is half of the peak value 39. The second set of timing signals 34 shows the case when a positive error is produced. In this case, K' lags J' by more than 180 degrees 42, resulting in an output function Q' that has an average level 44 that is higher than the half way point level 40. The third set of timing signals 36 shows the case when a negative phase error is produced. In this case, K" lags J'" by less than 180 degrees, e.g. amount 46, and as a result, the output of the JK flip-flop 30 has any average level 48 that is less than the half way point level 40.

Although both of the above mentioned phase detection methods use digital components, the methods still have to rely on analog components to extract the phase error information. It is the object of the present invention to achieve a phase detection method that permits full digital implementation.

SUMMARY OF INVENTION

The above object has been achieved by the present invention which provides a method and an apparatus for performing clock data recovery for a high-speed serial communication system utilizing low speed digital CMOS components. The present invention reduces the processing frequency requirement of the phase detection circuit and the loop filter circuit by sampling multiple bits of data simultaneously. The present invention also provides a unique phase detection method that detects phase errors by sampling each data bit using a pair of clock signals with different phase. While one of the clock signals is set to sample the eye, i.e. the middle of the data bit pattern, the other clock signal samples the transitional area. By comparing the data bit value with the transitional bit value, phase error information is extracted. A digital filter downstream of the phase detector sifts out high frequency phase jitters from the phase error signals using a digital counter that keeps track of the phase info from the phase detector. The digital counter is segmented in a way such that the most significant portion is outputted to a phase interpolator for phase selection while the least significant portion is ignored. The phase interpolator uses the signal from the digital filter to fine-tune its clock phase output in such a way that subsequent phase errors are minimized.

BRIEF DESCRIPTION OF THE DRAWINGS

FIG. 1 is a block diagram showing a clock data recovery circuit of the prior art.

FIG. 2 is a series of timing diagrams that show the operation of an XOR as a phase detector, as is known in the prior art.

FIG. 3 is a series of timing diagrams that show the operation of a JK flip-flop used as a phase detector, as is known in the prior art.

FIG. 4 is a block diagram of the preferred embodiment of a clock data recovery circuit of the present invention.

FIG. 5 is a series of timing diagrams that illustrate the operation of the apparatus of FIG. 4.

FIG. 6 is a circuit diagram of the phase detector used in the apparatus of FIG. 4.

FIG. 7 is a series of timing diagrams showing the operation of the phase detector of FIG. 6.

FIG. 8 is a circuit diagram showing an implementation of a re-sampler used in the apparatus of FIG. 4.

FIG. 9 is a series of diagrams showing operation of the apparatus of FIG. 4.

FIG. 10 is a block diagram of an alternative embodiment of a clock data recovery circuit of the present invention.

DETAILED DESCRIPTION OF PREFERRED EMBODIMENT

With reference to FIG. 4, sampler 70, a re-sampler 72, a decision circuit 74, an averaging circuit 78, a reference clock generator 82, and a phase interpolator 80, and a divider 86 are all seen to be electrically connected. The sampler 70, the re-sampler 72 and the decision circuit 74 as a group could be viewed as the phase detector in a conventional CDR circuit, while the reference clock generator 82 and the phase interpolator 80 as a group could be looked upon as a phase generator. The averaging circuit is the equivalent of a loop filter in a conventional CDR.

The goal of the CDR of the present invention is to maintain the primary sampling clock phase generated by the phase interpolator 80 at the eye, i.e. a point that is midway between transitions, of the each data bit. To do so, each bit of incoming data is sampled twice using a pair of clock signals with identical frequency but with a fixed phase difference that amounts to half the length of a data bit. Provided that a transition has occurred, if the two samples are the same, then this implies that the sampling clock is lagging the incoming data. FIG. 5a provides a graphical representation of such an occurrence. In the figure, sampling clock signals are used that have the same frequency as the incoming data so as to make the concept clearer. In practice, a slower clock would be used as will be described below. As shown in FIG. 5a, the clock signals clk+ 101 and clk– 103 are complements of one another. In this case, clk+ 101 lags the eye 102 of the data bit D0 104 by a phase distance of d 100, causing the clk– signal 103 to sample the same bit of data. In another instance, which is shown in FIG. 5b, clk+ 105 leads the eye 106 of data bit D0 99, causing clk– 107 to sample the previous data bit D-1 109. Provided that a transition has occurred between D-1 and D0, the two samples would be different from one another. The phase detector 76 of the present invention detects phase error by first determining whether a transition occurred, and then examining whether the two samples are different.

Referring back to FIG. 4, the task of the phase detector 76 of the present invention can be carried out in three functional blocks, the sampler block 70, the re-sampler block 72 and the decision block 74. In the preferred embodiment, the sampler block 70 of the present invention samples the incoming serial data signals 71 using four different clock phases running at half of the clock speed of the incoming clock signal. An example of such a sampler circuit 70 is shown in FIG. 6, in which the incoming serial stream 71 is fed into four rows of shift registers 111, 112, 113, 115. Each row has four shift registers connected in a parallel fashion. Clock signals 114 and 116, which are connected to the first row 111 and second row 112 of shift registers respectively, are complements of one another. Since these clocks are running at half the speed of the incoming data 71, each row of shift registers would retain only every other bit of data. Hereinafter, for the purpose of explanation, the data bits sampled by the first row of shift register 111 will be arbitrarily denoted as the even numbered data bits of D0, D2, D4, D6, D8, while the data bits sampled by the second row of shift registers 112 will be denoted as the odd numbered data bits of D1, D3, D5, D7, D9.

The corresponding transition bits are collected by the third row 113 and the fourth row 115 of registers. The sampling rate is dictated by a second pair of complementary clock signals, which are labeled as transition clk+ 118 and transition clk– 120 in FIG. 6. The transition clk+ 118 is at a 90 degree phase offset from the data clocks clk+ 114 and, following the convention described above, the data retained in this row of registers 113 will be denoted as the even transitional data of T0, T2, T4, T6, and T8. By the same token, the transition clk– 120 is at a 90 degree phase offset from the data clocks clk– 116 and the data retained in this row of registers 115 will be denoted the odd transitional data of T1, T3, T5, T7, and T9.

Timing diagrams in FIG. 7 demonstrate how the sampler 70 works. As has been mentioned earlier, the data clk+ 114 and data clk– 116 are operating at half the rate of the incoming data stream 71. The rising edge of each of the clocks 114 and 116 initiates the retainment of a data signal as is indicated by the solid curvy arrows 148 and 150. As a result, data clk+ 114 generates a stream of even data bits 140 while data clk– 116 generates a stream of odd data bits 142. The transition clk+ 118 and transition clk– 120 generate an even serial transitional bit stream 144 and an odd transitional bit stream 146, as is indicated by dotted curvy arrows 152 and 154.

The function of the re-sampler block 72 is to recombine the even and odd data bits and the even and odd transition bits to form to two sets of 10-bit numbers, one set containing the data bits and the other set containing the transitional bits. FIG. 8 shows the implementation of one such circuit. As shown in the figure, the top two rows of registers 111 and 112 are the same top two rows of registers in the sampler 70 shown in FIG. 6, with even data bits D0, D2, D4, D6, D8 appearing in the first row of registers 111 and odd data bits D1, D3, D5, D7, D9 appearing in the second row of registers 112. The re-sampler circuit 72 consists of a bank of ten registers 160 whose inputs are connected to various points in the even and odd rows of registers 111 and 112 in such a way that the data are realigned in their proper numerical order. Since this re-sampling operation takes ten samples at a time, the re-sampling registers 160 respond to a single clock 162 that is running at one-fifth the speed of the clock 114, 116 in the sampler circuit 70 and one-tenth the speed of the original clock 84 from the reference clock generator 82. The outputs of these registers 160 are saved into a 10-bit register 164. Similarly, the two rows of transitional registers 113 and 115, shown in FIG. 6, are connected in the same manner to another bank of ten registers that have not been shown in the diagram and their outputs are saved into another 10-bit transitional bit register 166, which is shown in FIG. 8.

The decision circuit 74 compares the two 10-bit registers 164 and 166 to extract phase error information and output results to the averaging circuit 78. FIG. 8 shows how such decisions are made. As an example, the two 10-bit registers 164 and 166 have arbitrarily been given a set of binary values. The decision circuit first determines whether there are transitions between data bits in the data register 164. If there is no transition at all, no phase error information can be extracted. In a 10-bit register, there are nine possible total transitions. In the example shown in FIG. 8, the data register 164 has a total of seven transitions only, as there are no transition between D1–D2 and D5–D6. For those data bits that come right after a transition, the decision circuit 74 compares each data bit with its corresponding transitional bit and then generates either a leading or lagging phase error signal. For instance, the decision circuit would compare D1 with T1, and based on the fact that they are different, would issue a positive signal indicating that the sampling clock 81 is leading the data stream 71. In a similar manner, the decision circuit 74 would issue a negative sign after comparing D4 with T4 based on the fact that the two bits are the same.

The decision circuit 74 feeds phase error information into the averaging circuit 78 in the form of up signal 88 and down signal 90, wherein each individual phase error signal is added or subtracted from a running total. By carefully selecting which portion of the running total is to be outputted to the phase interpolator 80 for phase selection, high frequency noise is filtered out. FIG. 9 shows how a synchronous digital counter can be used to perform the averaging function. In the figure, a series of diagrams is used to illustrate how phase error signals are filtered. In the figure, each counter diagram is divided into 3 sections, each section 3-bits wide. These sections are a phase step section 180, a phase interpolator section 182, and a filter section 184. The filter section contains the three least significant digits of the counter. These bits are left unconnected. The main purpose of having such a section 184 is to filter out high frequency jitters in the CDR. In effect, noise in the form of high frequency jitters of the phase errors is prevented from reaching the interpolation counter 182, thereby making the phase response of the CDR much more stable.

The phase interpolator 80 uses information in the phase step counter 180 and the interpolation counter 182 from the averaging circuit 78 to determine its output phase clock by interpolating between two adjacent phase steps outputted from a reference clock generator 82. FIG. 10 shows how the divide-by-two phase interpolator 200 of the present invention works with the reference clock generator 82 and the averaging circuit 78 to generate a clock output 81. This circuit has been fully described in U.S. application Ser. No. 10/097,492 and is hereinafter incorporated by reference. The reference clock generator 82 feeds eight evenly divided phases 84 with identical clock frequency into the phase interpolator 200, wherein two adjacent clock phases are chosen for interpolation based on the output of the phase step counter 180. Furthermore, based on the 3-bit interpolator counter 182 input, the phase interpolator 200 would pick among 8 possible phases between the two adjacent phases for its clock output 81. The divide-by-two clock output feeds directly back to the clock input 81 of the sampler 70 and indirectly to the re-sampler circuit 72, decision circuit 74, and the averaging circuit 78 through a divide-by-5 circuit 202 to provide a clock signal 83, whose speed is one-tenth of the data clock speed 71.

The invention claimed is:

1. A clock data recovery circuit comprising:
   ai) a sampling circuit having data input terminals that receives a plurality of serial data signals with a known data rate, said serial data signals including a plurality of even data bits and a plurality of odd data bits, each of the even and odd data bits having an eye;
   aii) a first, second, third and fourth clock input terminals receiving four clock signals running at half said data rate, wherein the first clock signal having a phase that is aligned with the eyes of the even data bits, the second clock signal having a phase that is aligned with the eyes of the odd data bits, the third clock signal having a phase that is aligned with the odd-to-even data bit transitions, and the fourth clock signal having a phase that is aligned with the even-to-odd transition, said first, second, third and fourth sets of clock input being connected to a first, second, third and fourth sets of flip-flops, with the flip-flops in each set connected in series, and the output of each flip-flop from the first, second, third and fourth sets of flip-flops forming a first, second, third and fourth sets of parallel outputs;
   b) a re-sampling circuit connected to said sampling circuit having a clock input, a first, second, third and fourth sets of parallel data inputs, and a first and second sets of parallel data output terminals, wherein the clock input, which receives a clock signal that is running at a fraction of the speed of the clock signals in the sampler circuit, supplies clock signal inputs to a fifth and sixth sets of flip-flops, wherein said first, second, third and fourth sets of data inputs are connected to the first, second, third and fourth set of parallel data outputs from the sampler, wherein the first and second sets of inputs, which carry the even and odd data bits from the sampler, are interleaved together in an alternate manner to form a single set of inputs that feeds into the inputs of the fifth set of flip-flops, wherein the third and fourth sets of inputs, which carry the even and odd transitional bits from the sampler, are interleaved together in an alternate manner to form a set of inputs that feeds into the inputs of the sixth set of flip-flops, and wherein the output of the fifth set of flip-flops is connected to the first set of parallel data output terminals and the output of the sixth set of flip-flops is connected to the second set of parallel data output terminals;
   c) a decision circuit connected to said re-sampling circuit having a clock input, a first and second set of data input terminals, a set of comparators that compares the first set of data inputs with the second set of data inputs and exports the result in the form of leading and lagging signals through a set of output terminals, wherein the clock input shares the same clock to the re-sampling circuit, the first set of data input receives signals from the first set of data output from the re-sampling circuit and the second set of input receives signal from the second set of data output from the re-sampling circuit;
   d) an averaging circuit connected to said decision circuit having a digital counter of at least two bits that keeps track of the leading and lagging signals by adding and subtracting from a running total, wherein the digital counter is divided into a first and second sections, the first section containing the most significant bit and the second section containing the least significant bit, whereby the first section is used as an output;
   e) a divide-by-two phase interpolating circuit connected to said averaging circuit having at least one controlling input and a plurality of clock inputs and outputs and four clock signals that have a frequency half that of the input clock signals and each having a phase that is offset by 10 degrees from one another, wherein the controlling input is fed by the output of the averaging circuit and the plurality of clock inputs share a common frequency but having different phases, whereby the phase interpolating circuit uses the information in the controlling input to select a set of clock phase for output; and
   f) a divider circuit connected to said divide-by-2 phase interpolator that reduces the clock frequency of the output from the phase interpolating circuit and outputs the reduced clock signal to the re-sampling circuit and the averaging circuit.

\* \* \* \* \*